(12) United States Patent
Sasaki

(10) Patent No.: US 9,142,031 B2
(45) Date of Patent: Sep. 22, 2015

(54) IMAGE PROCESSING APPARATUS WITH DETECTION OF MOTION VECTOR BETWEEN IMAGES, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Takashi Sasaki, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 70 days.

(21) Appl. No.: 14/019,681

(22) Filed: Sep. 6, 2013

(65) Prior Publication Data

US 2014/0072179 A1 Mar. 13, 2014

(30) Foreign Application Priority Data

Sep. 7, 2012 (JP) ................................ 2012-197062

(51) Int. Cl.
*G06K 9/00* (2006.01)
*G06T 7/20* (2006.01)
(52) U.S. Cl.
CPC .................................. *G06T 7/2013* (2013.01)
(58) Field of Classification Search
USPC ......................................................... 382/103
See application file for complete search history.

(56) References Cited

U.S. PATENT DOCUMENTS

| | | | | |
|---|---|---|---|---|
| 5,557,323 A * | 9/1996 | Kajiwara | ....................... | 348/140 |
| 5,572,258 A * | 11/1996 | Yokoyama | ................. | 348/415.1 |
| 6,766,037 B1 * | 7/2004 | Le et al. | ........................ | 382/107 |
| 2002/0146176 A1 * | 10/2002 | Meyers | ......................... | 382/218 |
| 2005/0100095 A1 * | 5/2005 | Itoh et al. | ................. | 375/240.16 |
| 2005/0220190 A1 * | 10/2005 | Ha et al. | .................. | 375/240.16 |
| 2006/0017843 A1 * | 1/2006 | Shi et al. | ........................ | 348/441 |
| 2006/0153472 A1 * | 7/2006 | Sakata et al. | .................. | 382/255 |
| 2007/0025443 A1 * | 2/2007 | Inokuma | .................. | 375/240.16 |
| 2008/0002907 A1 * | 1/2008 | Xu et al. | ....................... | 382/274 |
| 2008/0063067 A1 * | 3/2008 | Hirayama et al. | ....... | 375/240.16 |
| 2008/0240583 A1 * | 10/2008 | Jones | ............................. | 382/232 |
| 2013/0094759 A1 * | 4/2013 | Yagi et al. | ..................... | 382/170 |
| 2013/0336596 A1 * | 12/2013 | Toyoda et al. | ................ | 382/274 |
| 2014/0072179 A1 * | 3/2014 | Sasaki | ........................... | 382/107 |

FOREIGN PATENT DOCUMENTS

| | | |
|---|---|---|
| JP | 2009-153093 A | 7/2009 |
| JP | 2010-288110 A | 12/2010 |

OTHER PUBLICATIONS

Kuratsume, et al., CVIM Tutorial Series Computer Vision, Advanced Communication Media Co., Ltd. (JP), The leading-edge guide 1, (ISBN: 978-4915851346), Second chapter "Graph cut", p. 69-p. 71.

* cited by examiner

*Primary Examiner* — Alex Liew
(74) *Attorney, Agent, or Firm* — Rossi, Kimms & McDowell LLP

(57) ABSTRACT

An image processing apparatus that is capable of improving the alignment accuracy by detecting a motion vector accurately even if there is a low contrast region or a repeating pattern region. A division unit divides each of inputted images into blocks of a predetermined size. A first determination unit determines whether contrast in a block is less than a predetermined contrast for each of the blocks. A size changing unit changes the size of the block concerned when the first determination unit determines that the block concerned is low contrast. A motion vector detection unit detects a motion vector by comparing images in each pair of corresponding blocks between the images.

16 Claims, 16 Drawing Sheets

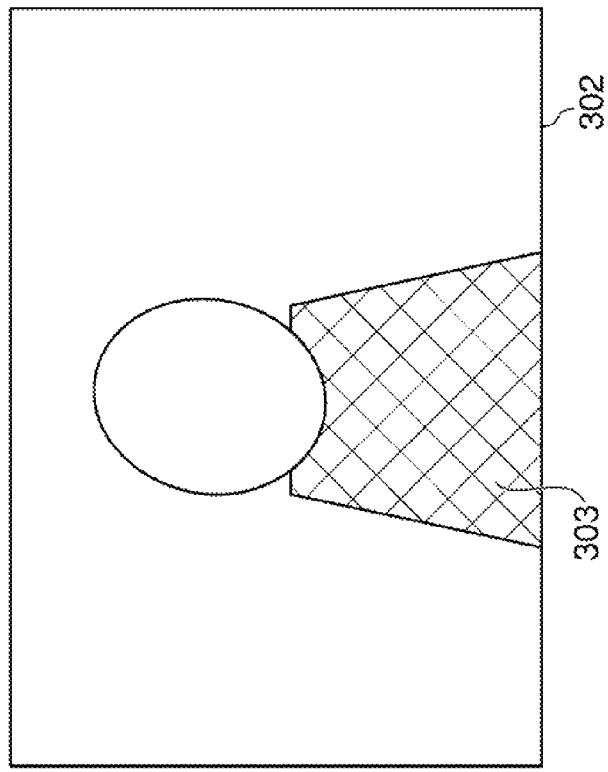
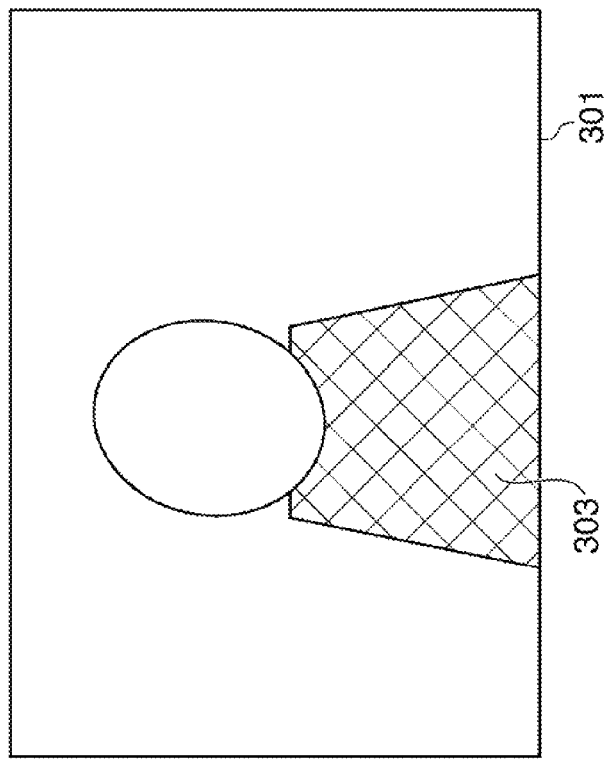

FIG.5

| 250 | 170 | 119 | 104 | 35  | 25  | 29  |
|-----|-----|-----|-----|-----|-----|-----|
| 261 | 180 | 117 | 108 | 22  | 8   | 11  |
| 200 | 210 | 100 | 89  | 26  | 17  | 16  |
| 190 | 220 | 70  | 45  | 49  | 38  | 31  |
| 310 | 270 | 111 | 72  | 64  | 67  | 63  |
| 312 | 305 | 138 | 102 | 101 | 84  | 76  |
| 300 | 311 | 173 | 270 | 120 | 119 | 120 |

SAD VALUE TABLE

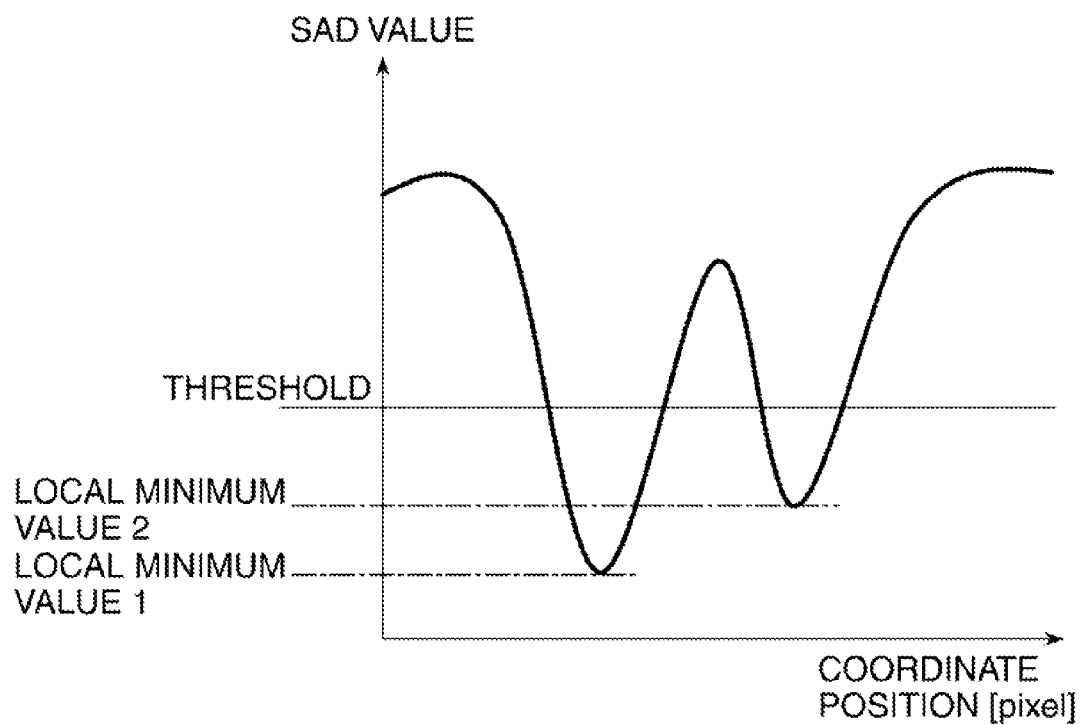

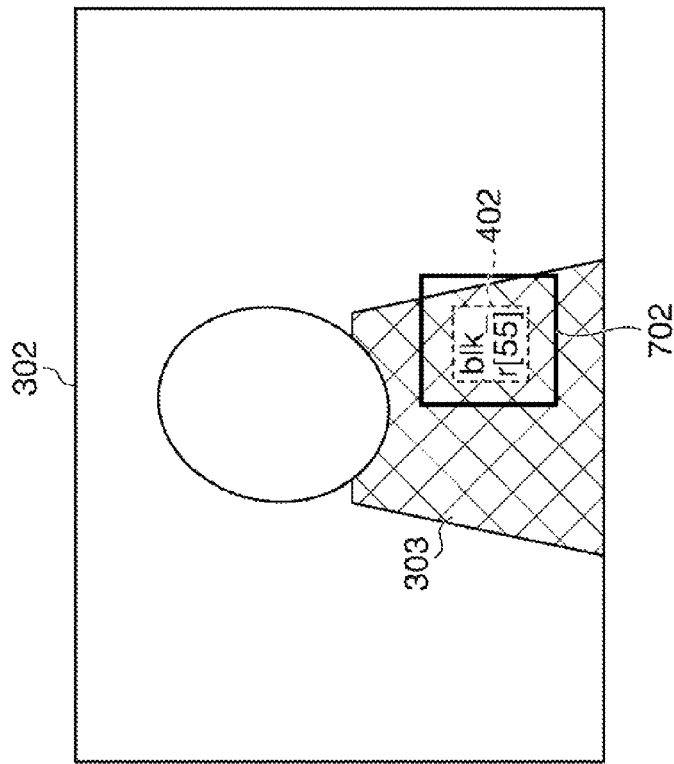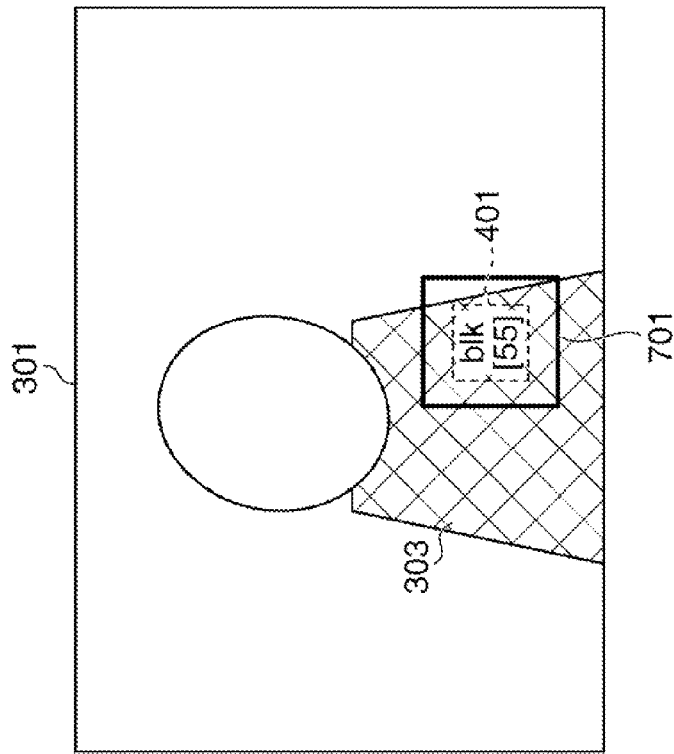

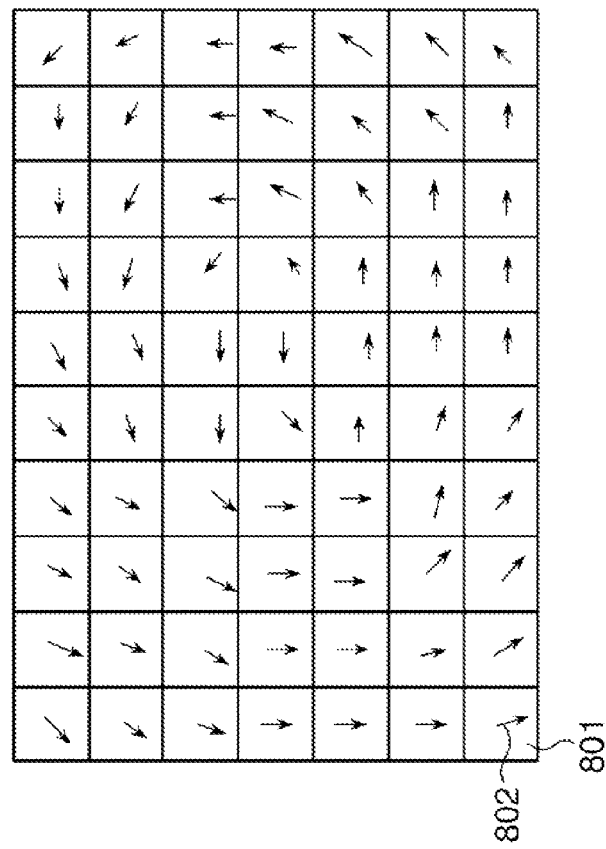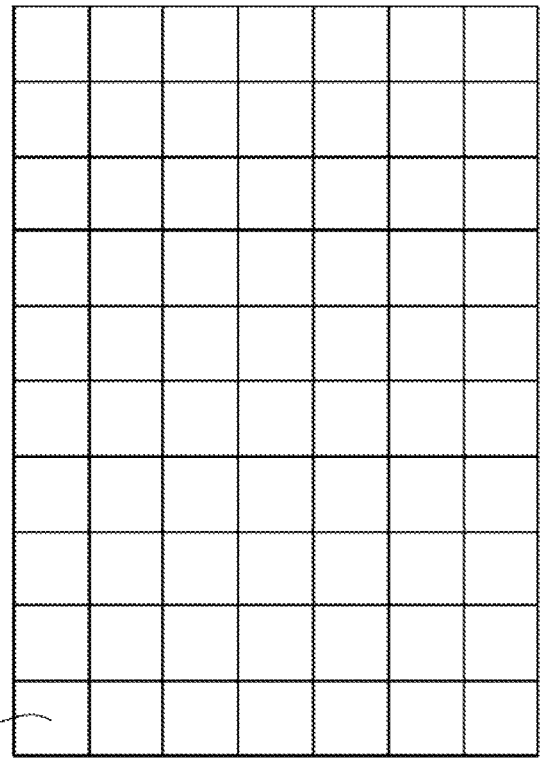

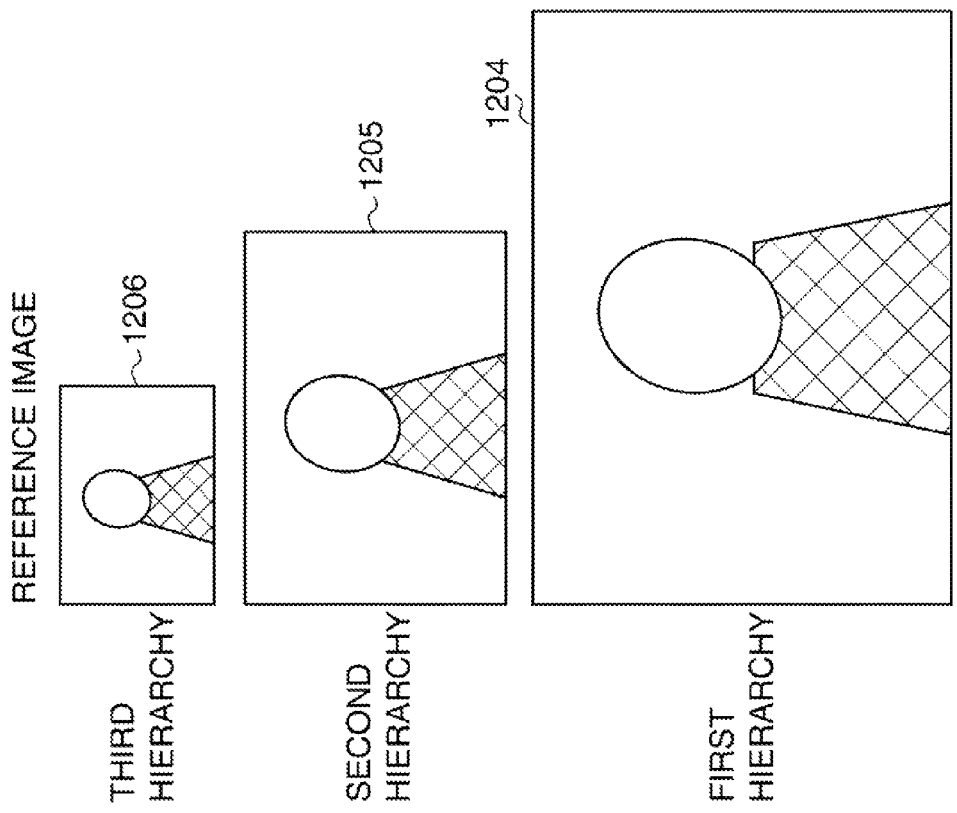
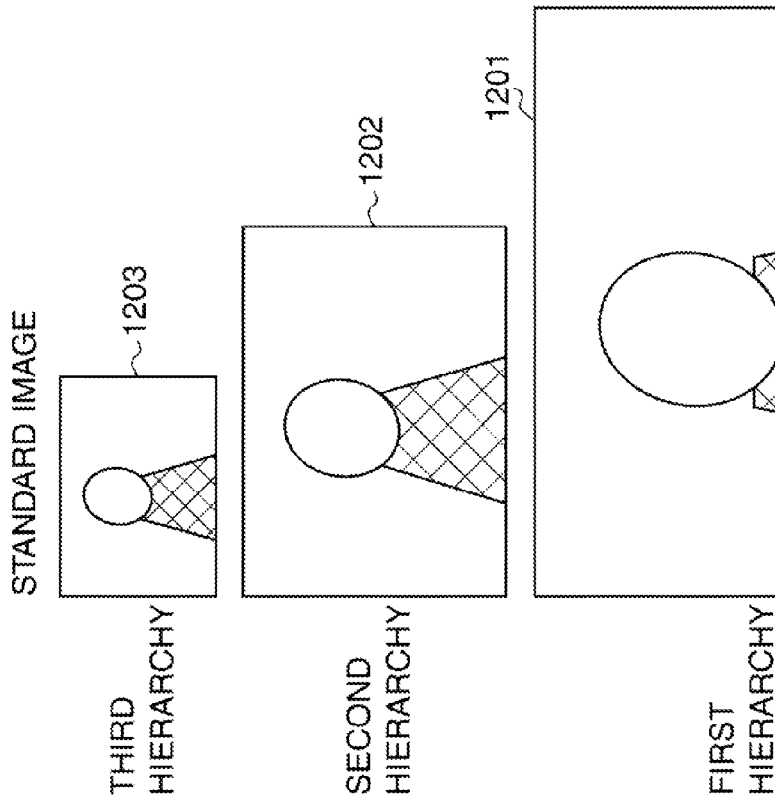
FIG.12A
FIG.12B

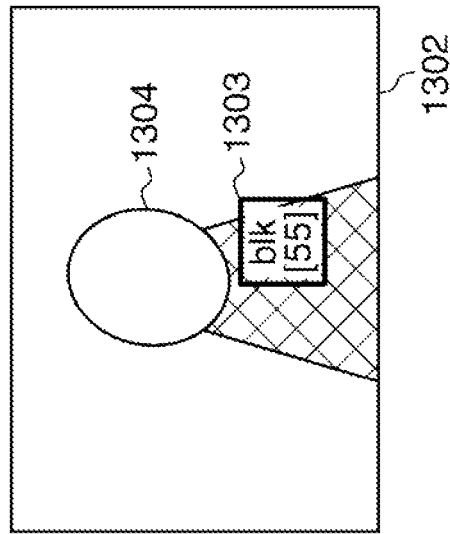
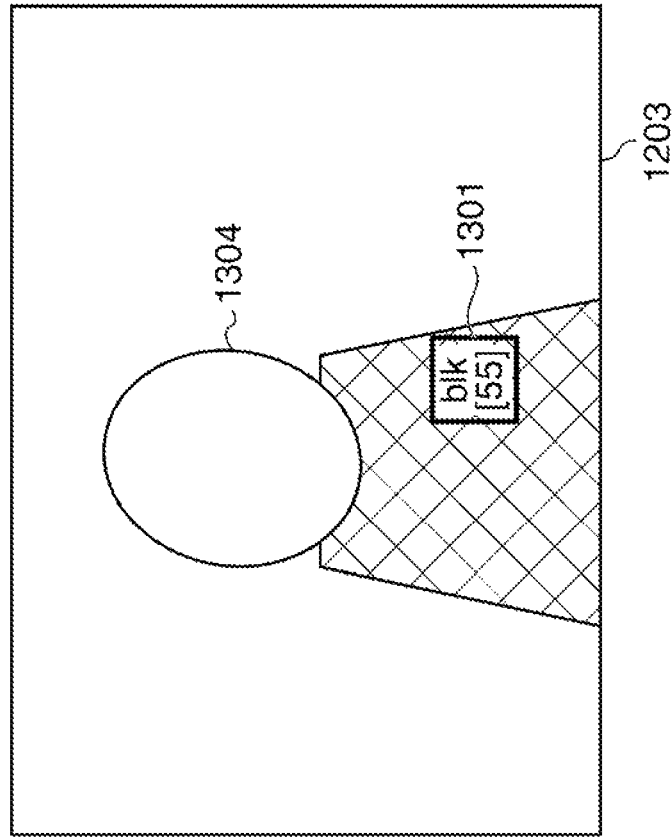

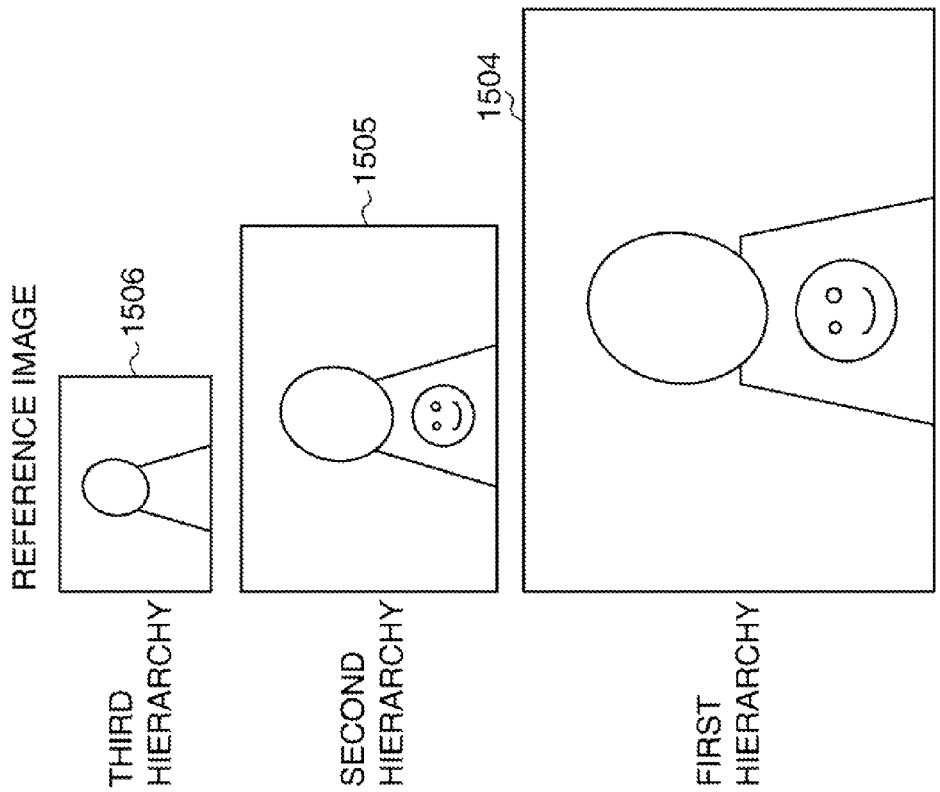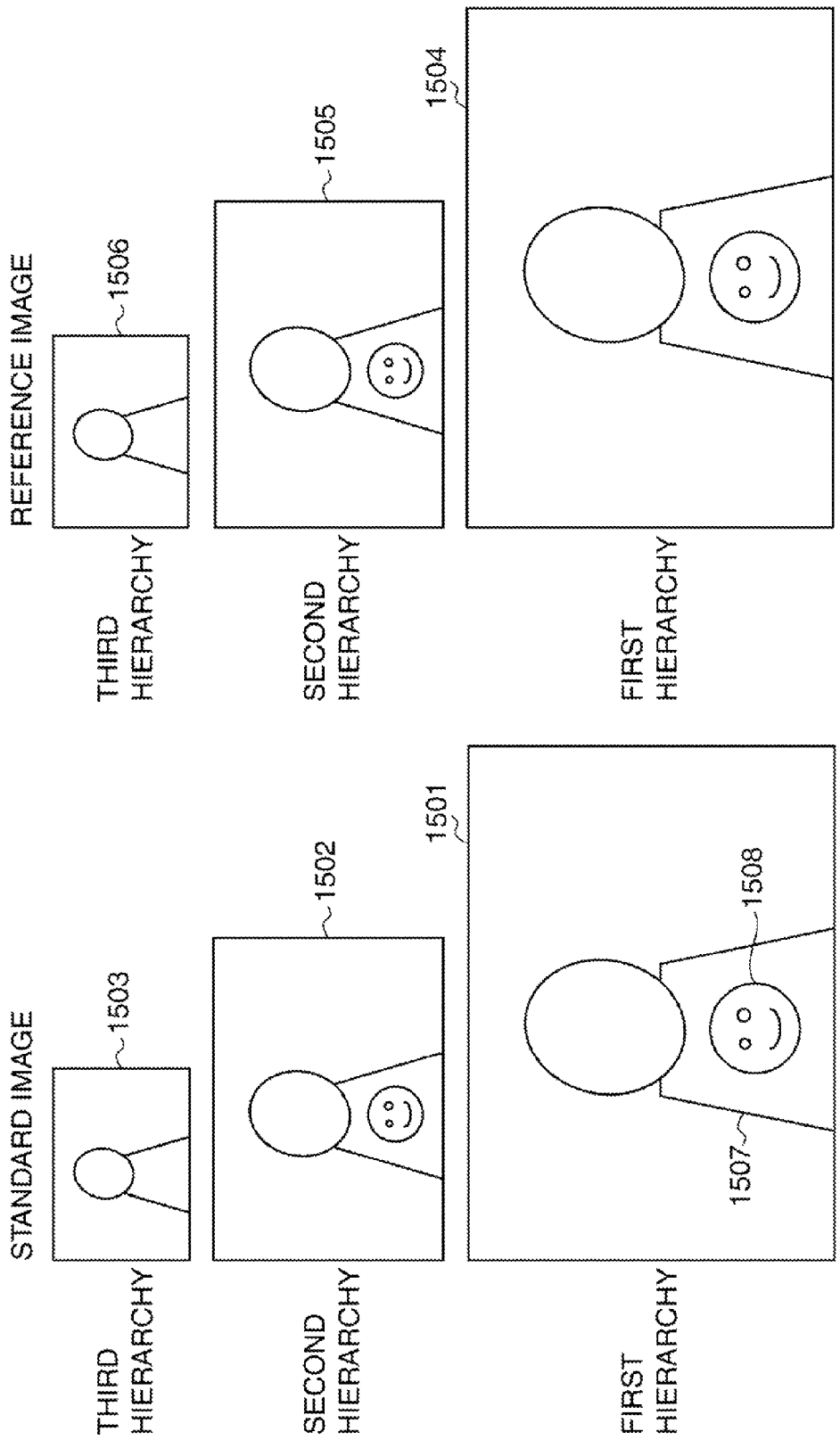

IMAGE PROCESSING APPARATUS WITH DETECTION OF MOTION VECTOR BETWEEN IMAGES, CONTROL METHOD THEREFOR, AND STORAGE MEDIUM STORING CONTROL PROGRAM THEREFOR

BACKGROUND OF THE INVENTION

1. Field of the Invention

The present invention relates to an image processing apparatus that processes an image by detecting a motion vector between two images, and a control method therefor, and a storage medium storing a control program therefor.

2. Description of the Related Art

There is a known image processing apparatus that detects a motion vector between two images and performs various types of image processing using the motion vector.

For example, when dynamic image data is processed using a motion vector between two frames, the dynamic image data can be efficiently compressed. Furthermore, processes, such as a pan-tilt detection and subject tracking of a television camera can be performed using a motion vector.

In addition, applications of image processing using a motion vector are advanced in recent years. For example, a motion vector is used to composite two images by superimposing the images in order to reduce noise in images taken under a low illumination condition.

A motion vector is detected by block matching, or a gradient method, for example, and the block matching is used widely in general.

In the block matching, a motion vector is detected according to a correlation between a reference image and a standard image that are attention images. In this case, each of the reference image and the standard image is divided into rectangular blocks (regions) of a predetermined size, and a correlation between the reference image and the standard image is calculated for every block.

The detection of a motion vector according to a conventional block matching will be described hereafter.

FIG. 16A and FIG. 16B are views showing a detection principle of the motion vector according to the conventional block matching.

FIG. 16A shows a standard image 1601 among two images that are subject to the block matching. The standard image concerned is divided into rectangular regions (referred to as standard blocks hereafter) 1602 of a predetermined size. Each of the standard blocks 1602 has pixels that are arranged in a horizontal direction and a vertical direction. FIG. 16B shows the reference image 1603 among the two images.

In the block matching, the reference image 1603 is searched for a reference block that has high correlation with the standard block 1602. A reference block 1604 of the same size as the standard block 1602 is set in the reference image 1603.

A rectangular search range 1605 that is set to be broader than the reference block 1604 in the reference image 1603 is searched for the position of the reference block 1604 that has the highest correlation with the standard block 1602.

At this time, a SAD (Sum of Absolute Difference) value is calculated for every pixel in the search range 1605, and the position where the SAD value becomes minimum is determined as the position of the reference block 1604 that has the highest correlation with the standard block 1602. Then, the difference between the coordinate of the reference block 1604 that was determined by the search and the coordinate of the standard block 1602 shall be a motion vector 1607.

In the above-mentioned block matching, since the correlations between the standard block 1602 and all the reference blocks 1604 set in the search range 1605 are calculated, the arithmetic processing amount for calculating the SAD values unescapably increases.

There is a known method that constitutes a hierarchy for each of the standard image and the reference image using a high resolution image and a low resolution image that is obtained by reducing the high resolution image. The method detects a motion vector for every hierarchy in order to reduce the arithmetic processing amount (see Japanese Laid-Open Patent Publication (Kokai) No. 2009-153093 (JP 2009-153093A)).

On the other hand, when a motion vector is hierarchically detected using the block matching, a motion vector may be misdetected in a region in which an image is flat (low contrast) and a region of a repeating pattern. That is, since the low contrast region has no pattern that is used to calculate the correlation between the reference block and the standard block, the minimum SAD value is not determined clearly.

Moreover, since the SAD value becomes small at the regions that coincide with the period of the repeating pattern, the high correlation regions will appear in the region of the repeating pattern. As a result, even if the minimum SAD value is selected, it may not correspond to a desired motion vector, and the motion vector may be misdetected.

In particular, if the misdetected motion vector is used to align and composite different two images, the alignment accuracy falls and the quality of the composite image deteriorates.

In order to cope with such misdetection, the technique of JP 2009-153093A excepts the low contrast region and the repeating pattern region from the target for detecting a motion vector when detecting one motion vector integrated in the whole image.

On the other hand, Japanese Laid-Open Patent Publication (Kokai) No. 2010-288110 (JP 2010-288110A) discloses a technique that reduces the arithmetic processing amount by minimizing the frequency of the calculation of a motion vector in the high resolution hierarchy when detecting a motion vector hierarchically.

The technique obtains an edge quantity in the standard block in the low resolution hierarchy, and detects a motion vector in the high resolution hierarchy when the edge quantity is more than a predetermined threshold value. On the other hand, when the edge quantity is less than the threshold value, the technique scales the motion vector in the low resolution hierarchy, and substitutes the scaled motion vector for the motion vector in the high resolution hierarchy.

However, since the method disclosed in JP 2009-153093A excepts the low contrast region and the repeating pattern region, the number of motion vectors decreases as the number of the excepted regions increases. Accordingly, the accuracy of the motion vector after integration may fall on the contrary.

Moreover, the method described in JP 2010-288110A is difficult to detect an exact motion vector because the contrast of the standard block becomes low in the low resolution hierarchy where the edge quantity is less than the threshold value.

SUMMARY OF THE INVENTION

The present invention provides an image processing apparatus, a control method therefor, and a storage medium storing a control program therefor, which are capable of improving the alignment accuracy by detecting a motion vector accurately even if there is a low contrast region or a repeating pattern region.

Accordingly, a first aspect of the present invention provides an image processing apparatus comprising a division unit configured to divide each of inputted images into blocks of a predetermined size, a first determination unit configured to determine whether contrast in a block is less than a predetermined contrast for each of the blocks, a size changing unit configured to change the size of the block concerned when the first determination unit determines that the block concerned is low contrast, and a motion vector detection unit configured to detect a motion vector by comparing images in each pair of corresponding blocks between the images.

Accordingly, a second aspect of the present invention provides a control method for an image processing apparatus comprising a division step of dividing each of inputted images into blocks of a predetermined size, a first determination step of determining whether contrast in a block is less than a predetermined contrast for each of the blocks, a size changing step of changing the size of the block concerned when it is determined that the block concerned is low contrast in the first determination step, and a motion vector detection step of detecting a motion vector by comparing images in each pair of corresponding blocks between the images.

Accordingly, a third aspect of the present invention provides a non-transitory computer-readable storage medium storing a control program causing a computer to execute the control method of the second aspect.

According to the present invention, the alignment accuracy of images is improved by detecting the motion vector accurately even if there is a low contrast region or a repeating pattern region.

Further features of the present invention will become apparent from the following description of exemplary embodiments with reference to the attached drawings.

BRIEF DESCRIPTION OF THE DRAWINGS

FIG. 3A and FIG. 3B are views showing a standard image inputted to the image processing apparatus shown in FIG. 1 and a reference image, respectively.

FIG. 5 is a view showing an example of a SAD value table generated in step S203 in FIG. 2.

FIG. 6 is a graph showing an example of distribution of the SAD values in an image including a repeating pattern.

FIG. 7A and FIG. 7B are views showing results of an expanding process that is applied to the standard block and the reference block shown in FIG. 4, respectively.

FIG. 8A is a view showing a state where the standard image, which is an inputted image to the motion vector detection process shown in FIG. 2, is divided into blocks.

FIG. 8B is a view showing a motion vector for every block shown in FIG. 8A.

FIG. 12A and FIG. 12B are views showing a hierarchical structure of the standard images and a hierarchical structure of the reference images, respectively, which are generated by the image reduction unit shown in FIG. 10.

FIG. 13A is a view showing the standard image in a third hierarchy shown in FIG. 12A, and FIG. 13B is a view showing the standard image in a fourth hierarchy that is obtained by reducing the standard image in the third hierarchy.

FIG. 15A and FIG. 15B are views showing a hierarchical structure of the standard images and a hierarchical structure of the reference images, respectively, which are generated by the image processing apparatus according to the third embodiment of the present invention.

DESCRIPTION OF THE EMBODIMENTS

Hereafter, embodiments according to the present invention will be described in detail with reference to the drawings.

Figure 1:
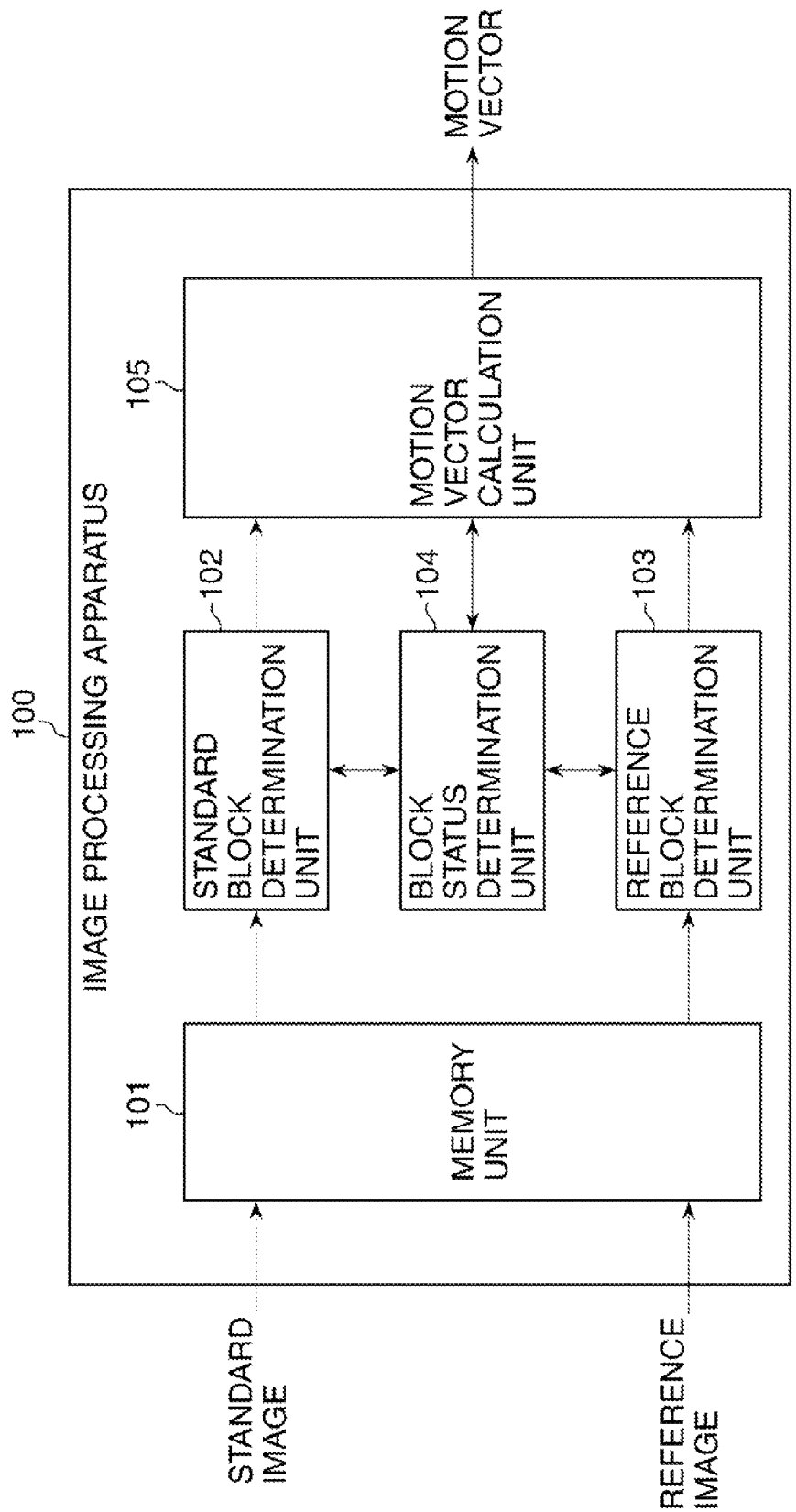
FIG. 1 is a block diagram schematically showing a configuration of an image processing apparatus according to a first embodiment of the present invention.

FIG. 1 is a block diagram schematically showing a configuration of an image processing apparatus according to a first embodiment of the present invention.

As shown in FIG. 1, the image processing apparatus 100 is provided with a memory unit 101, a standard block determination unit 102, a reference block determination unit 103, a block status determination unit 104, and a motion vector calculation unit 105.

Figure 2:
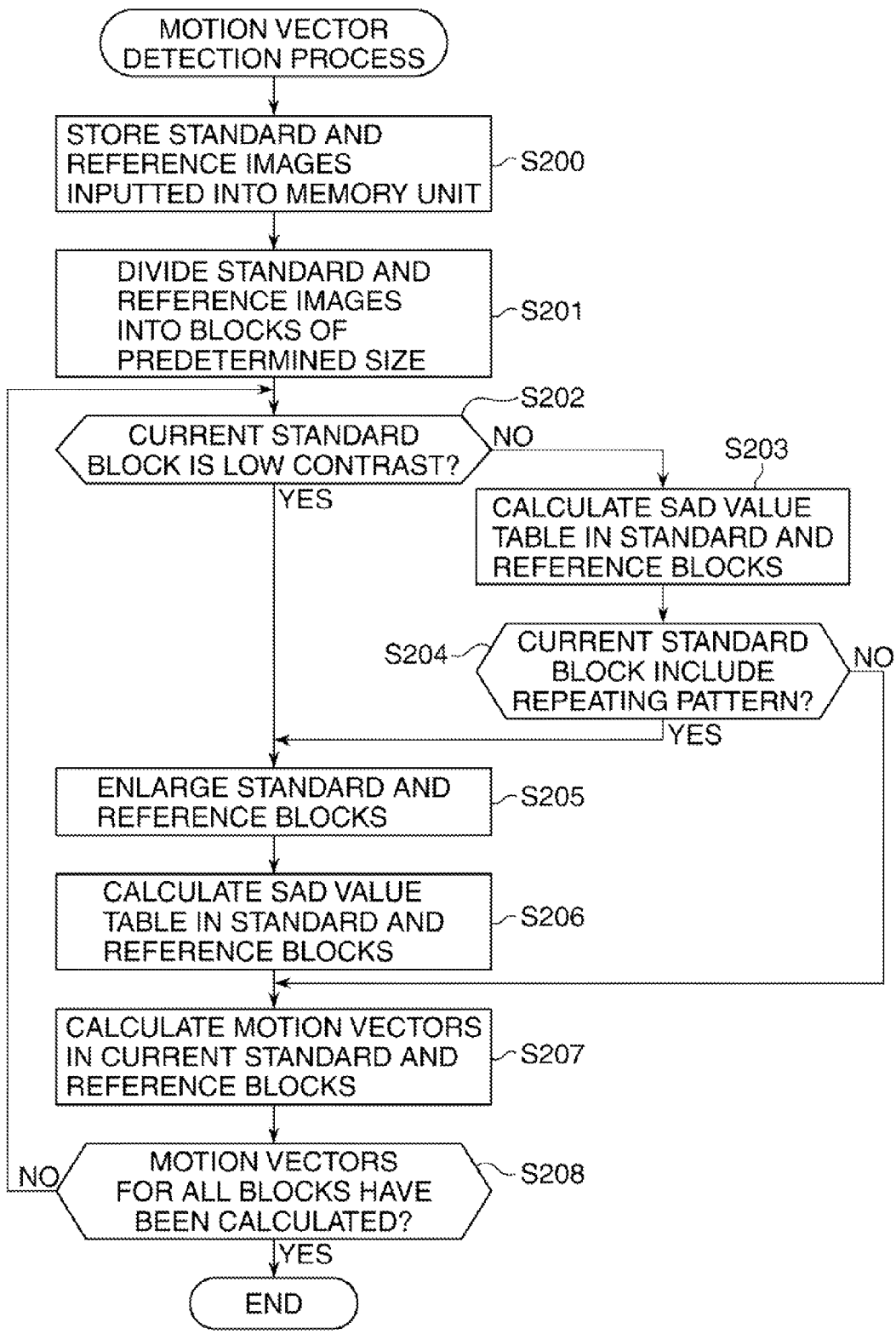
FIG. 2 is a flowchart showing a motion vector detection process in the image processing apparatus shown in FIG. 1.

FIG. 2 is a flowchart showing a motion vector detection process in the image processing apparatus shown in FIG. 1. FIG. 3A and FIG. 3B are views showing a standard image inputted to the image processing apparatus shown in FIG. 1 and a reference image, respectively.

When the motion vector detection process is started, the image processing apparatus 100 stores a standard image 301 and a reference image 302, which were inputted, into the memory unit 101 (step S200). In this example, a subject 303 with a repeating pattern shall be taken as the standard image and the reference image as shown in FIG. 3A and FIG. 3B.

Although the memory unit 101 stores two images that are the standard image 301 and the reference image 302 in this example, the memory unit 101 needs to store at least two image, it may store three or more images. Moreover, although a subject 303 with a repeating pattern is taken in the standard image 301 and the reference image 302, a subject is not limited to the subject 303 with the repeating pattern. A reduction process may be applied to an input image in advance.

Next, the standard block determination unit 102 and the reference block determination unit 103 read the standard image 301 and the reference image 302 from the memory unit 101, respectively. Then, the standard block determination unit 102 and the reference block determination unit 103 divide the standard image 301 and the reference image 302, respectively, into blocks of a predetermined size (step S201).

Figure 4B:
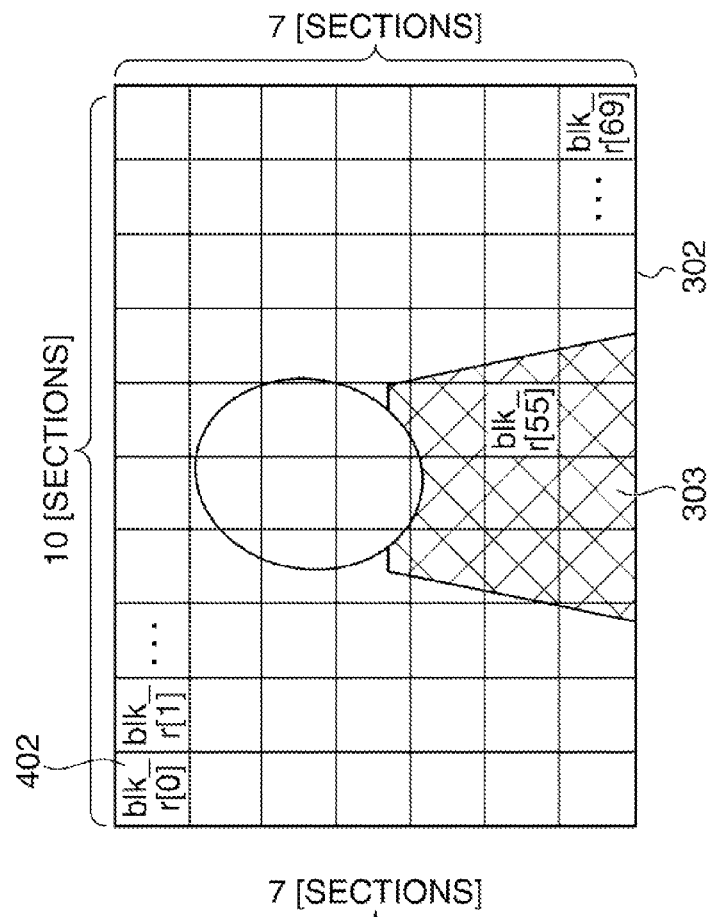
FIG. 4A and FIG. 4B are views showing the standard image divided by a standard block determination unit shown in FIG. 1 and the reference image divided by a reference block determination unit shown in FIG. 1, respectively.
Figure 4A:
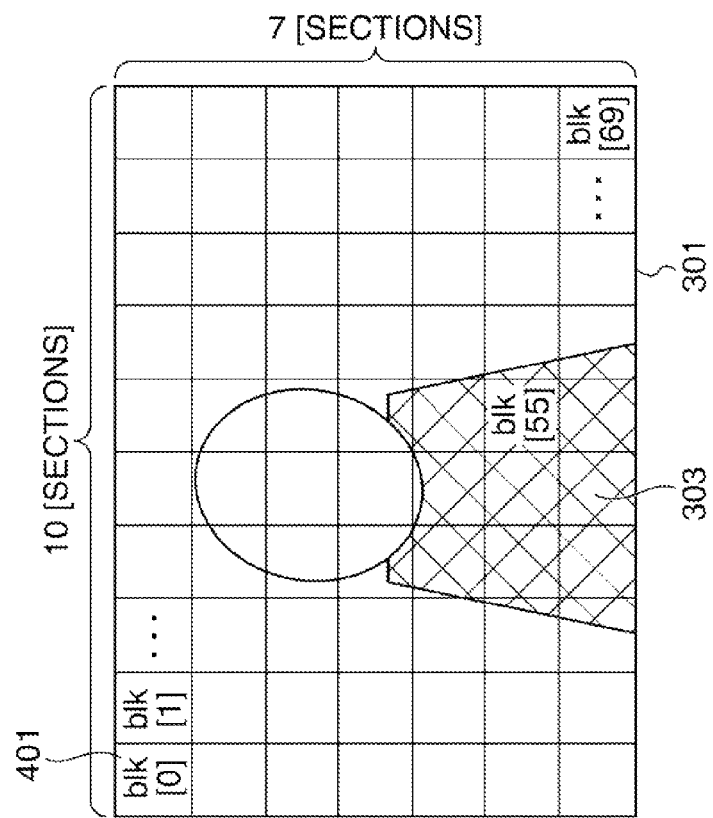

FIG. 4A and FIG. 4B are views showing the standard image 301 divided by the standard block determination unit 102 and the reference image 302 divided by the reference block determination unit 103, respectively.

As shown in FIG. 4A and FIG. 4B, each of the standard image 301 and the reference image 302 is divided into seven sections in a horizontal direction and into ten sections in a vertical direction so that seventy standard blocks 401 and seventy reference blocks 402 are formed. The sizes of the standard block 401 and the reference block 402 are 256*256 pixels, for example.

Reference characters blk[0] through blk[69] are sequentially given to the seventy standard blocks from the upper left, and reference characters blk_r[0] through blk_r[69] are sequentially given to the seventy reference blocks 402 from the upper left. Then, the standard blocks 401 are processed from blk[0] in order.

The block status determination unit 104 determines whether the contrast of the current standard block is lower than a predetermined contrast (step S202).

In this determination, the block status determination unit 104 extracts an edge of the standard block by applying a high-pass filtering process that allows to pass only a high frequency band. Next, the block status determination unit 104 calculates an edge integration value by totaling the pixel values about the edge concerned.

Then, the block status determination unit 104 compares the edge integration value with a predetermined threshold, and generates a histogram using the pixel values before applying the high-pass filtering process when the edge integration value is smaller than the threshold. When the histogram includes one local maximum value, the block status determination unit 104 determines that the standard block is low contrast.

Figure 16B:
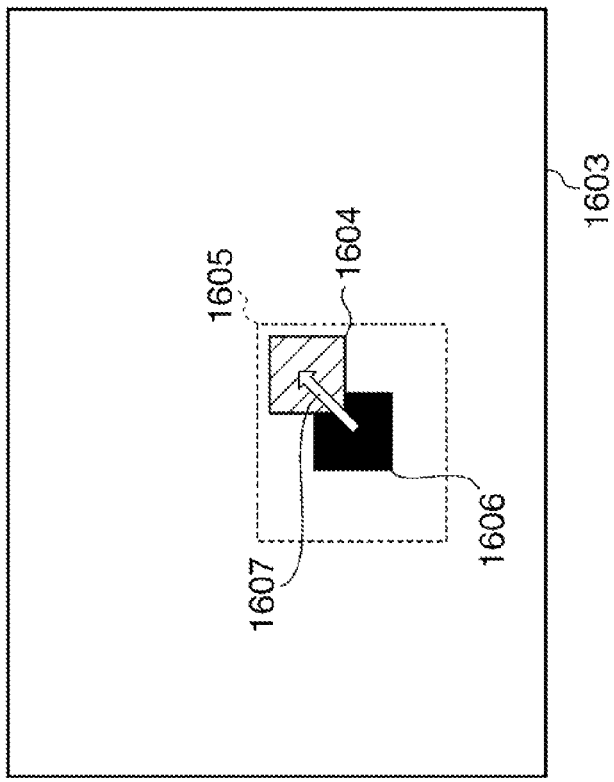
FIG. 16A and FIG. 16B are views showing searches in a standard image and a reference image, respectively, which show a principle for detecting motion vectors by a conventional block matching.
Figure 16A:
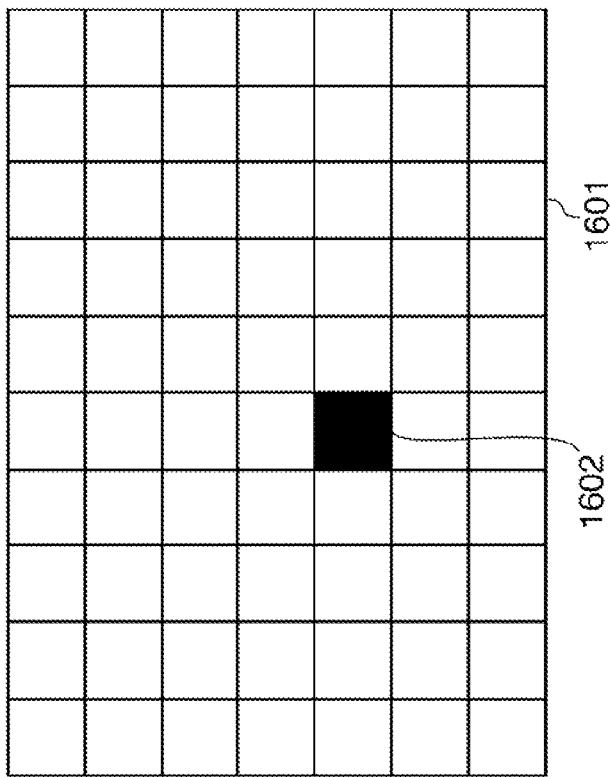

When determining that the standard block is not low contrast (NO in the step S202), the block status determination unit 104 calculates SAD (Sum of Absolute Difference) values using the standard block and the reference block according to the procedure shown in FIG. 16A and FIG. 16B (step S203). In this step, a SAD value table is generated by an array of the SAD values calculated for reference blocks within a search range.

FIG. 5 is a view showing an example of the SAD value table generated in the step S203 in FIG. 2.

In the example shown in FIG. 5, a SAD value is calculated by setting a search range to ±3 blocks in the horizontal direction and ±3 blocks in the vertical direction with respect to the standard block. Next, the block status determination unit 104 determines whether the standard block includes a repeating pattern by a well-known method with reference to the SAD value table (step S204). The well-known method is disclosed in Japanese Laid-Open Patent Publication (Kokai) No. 2011-35814 (JP 2011-35814A), for example.

FIG. 6 is a graph showing an example of distribution of the SAD values in an image including a repeating pattern. As shown in FIG. 6, when the image includes a repeating pattern, there are two or more local minimum values (the local minimum values 1 and 2, in this example) in the distribution of the SAD values. Accordingly, the block status determination unit 104 investigates the distribution of the SAD values according to the SAD value table shown in FIG. 5. Then, the block status determination unit 104 determines that the standard block includes a repeating pattern when there are two or more local minimum values that are smaller than a predetermined threshold. In the example shown in FIG. 4A, it is determined that the standard block blk[55] includes a repeating pattern.

When it is determined that the standard block does not include a repeating pattern (NO in the step S204), the process proceeds to step S207. On the other hand, when it is determined that the standard block includes a repeating pattern (YES in the step S204), the block status determination unit 104 expands the size of the current standard block and the reference block corresponding to the current standard block (step S205).

FIG. 7A and FIG. 7B are views showing results of the expanding process that is applied to the standard block and the reference block shown in FIG. 4, respectively.

In the examples shown in FIG. 7A and FIG. 7B, the block status determination unit 104 expands the standard block 401 and the reference block 402 of 256*256 pixels so as to obtain a standard block 701 and a reference block 702 of 512*512 pixels. In this step, a magnification ratio is determined so that the boundary of the subject 303 nearest to the standard block 401 and the reference block 402 is included in the expanded standard block 701 and the expanded reference block 702.

When the magnification ratio is calculated, a subject is extracted using the graph cut algorithm shown in the following document, and the distance from the center coordinate of the current standard block (or reference block) to the nearest boundary of the subject is obtained. Then, the magnification ratio is calculated according to the distance concerned.

Document for reference: CVIM Tutorial Series COMPUTER VISION The leading-edge guide 1 (ISBN: 978-4915851346) Advanced Communication Media Co., Ltd. Ryo Kuratsume, Hiroshi Ishikawa, Fumikazu Kato, Jun Sato, Takeshi Mita (Authors) Second chapter "Graph cut" P69-P71

As shown in FIG. 7A and FIG. 7B, each of the expanded standard block 701 and the expanded reference block 702 includes a part of the boundary of the subject in addition to the repeating pattern region.

Although two or more high correlation regions appear at the repeating patterns between the standard block 401 and the reference block 402 before the expansion, the highest correlation region appears at the boundary of the subject between the standard block 701 and the reference block 702 after the expansion. Accordingly, when the standard block and the reference block are expanded, only one high correlation region appears.

When the standard block is low contrast (YES in the step S202), the block status determination unit 104 proceeds with the process to step S205, and expands the current standard block and the reference block corresponding to the current standard block.

Next, the block status determination unit 104 generates a SAD value table using the expanded standard block and the expanded reference block as with the process in the step S203 (step S206).

Next, the motion vector calculation unit 105 calculates a motion vector using the SAD value table calculated in the step S206 (step S207). In this case, the minimum shift in the SAD value table becomes a motion vector. For example, in the SAD value table shown in FIG. 5, since the minimum value is "8", the motion vector (+2, +2) is obtained when the center of the standard block (the position of which the SAD value is "45") is an origin before the shift.

As mentioned above, when the motion vector is calculated according to the SAD value table that is obtained based on the expanded standard block and the expanded reference block, the motion vector is computable with high accuracy even if the standard block includes the repeating pattern. Then, even if the standard block is low contrast, a motion vector is computable with high accuracy in a similar manner.

Next, the motion vector calculation unit 105 determines whether the motion vectors for all the standard blocks have been calculated (step S208). When the motion vectors for all the standard blocks have not been calculated (NO in the step S208), the process returns to the step S202 and the same process is applied to the following standard block. On the other hand, when the motion vectors for all the standard blocks have been calculated (YES in the step S208), the image processing apparatus 100 finishes the motion vector detection process.

FIG. 8A is a view showing a state where the standard image, which is an inputted image to the motion vector detection process shown in FIG. 2, is divided into blocks. FIG. 8B is a view showing a motion vector for every block shown in FIG. 8A.

When the motion vector detection process shown in FIG. 2 is performed as mentioned above, a motion vector is obtained for each of the blocks 801 of the inputted image (standard image) shown in FIG. 8A, and the motion vectors 802 that differ from block to block are determined as shown in FIG. 8B.

Thus, the first embodiment of the present invention expands a standard block and a reference block corresponding to this standard block when the standard block is low contrast or includes repeating pattern. Then, since the motion vector is detected based on the SAD value table that is generated according to the expanded standard and reference blocks, the motion vector is detectable with high accuracy, which improves the accuracy of the alignment of images.

Subsequently, an image processing apparatus according to a second embodiment of the present invention will be described. The image processing apparatus according to the second embodiment detects a motion vector hierarchically.

When a motion vector is detected hierarchically, a reduction image with low resolution is generated by reducing lengths of a source image (a standard image or a reference image) in the horizontal and vertical directions to 1/n (n is an integer larger than 1). Then, the block matching is performed using the reduction image concerned, and a motion vector is detected in the reduction image. Then, the block matching is performed using the source images based on the detection result of the motion vector obtained with the reduction image.

Figure 9:
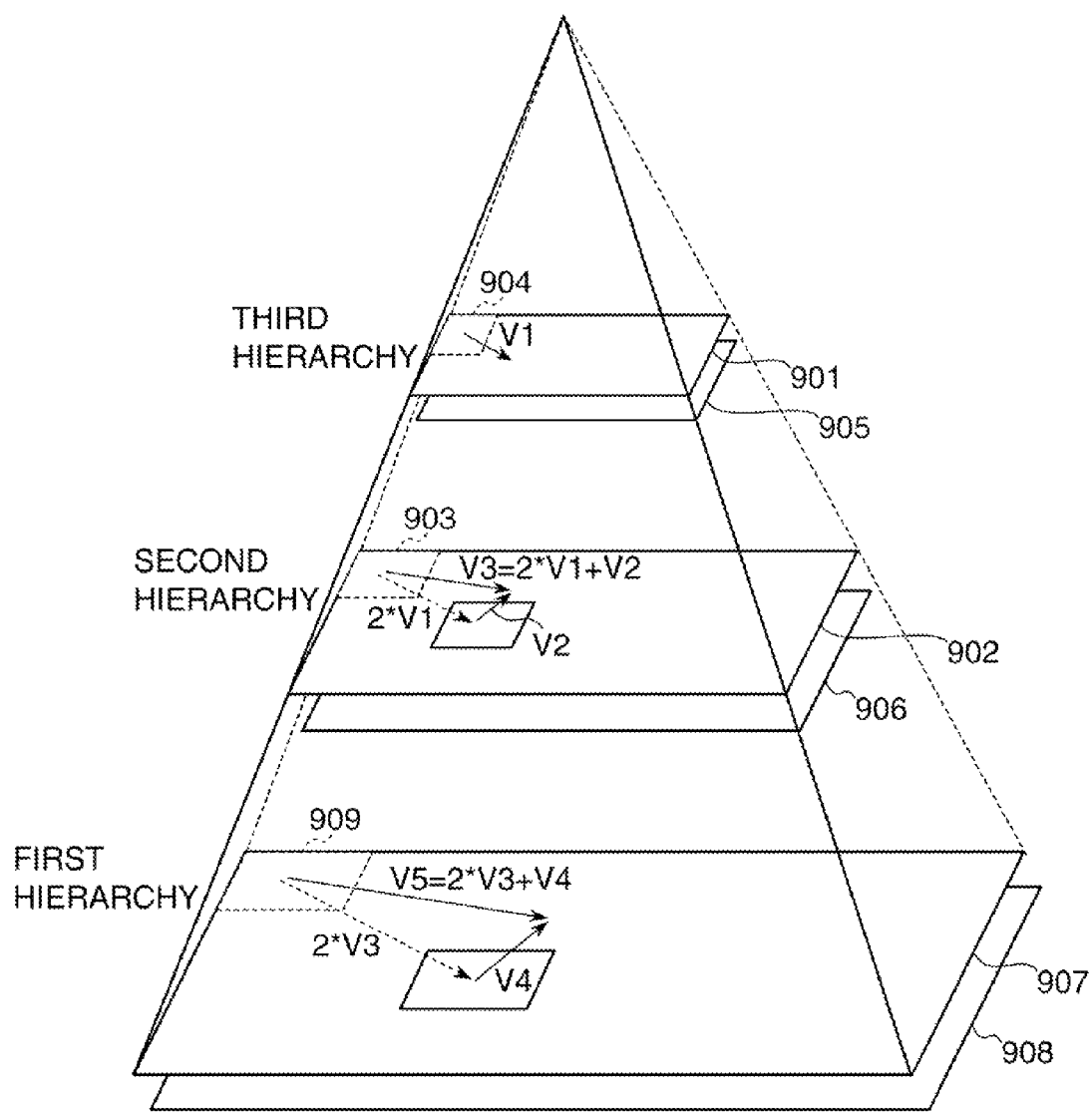
FIG. 9 is a view showing a principle for detecting motion vectors hierarchically performed with an image processing apparatus according to a second embodiment of the present invention.

FIG. 9 is a view showing a principle for detecting motion vectors hierarchically performed with the image processing apparatus according to the second embodiment of the present invention. It should be noted that "n" equals "2".

As shown in FIG. 9, input images (a standard image and a reference image) are referred to as a first hierarchy, images that are obtained by reducing the input images to ½ in lengths (¼ in area) are referred to as a second hierarchy, and images that are obtained by reducing the images in the second hierarchy to ½ in lengths (i.e., ¼ of the input images, 1/16 in area) are referred to as a third hierarchy. A source image means an image in the N-th hierarchy with respect to an image in the (N+1)th hierarchy. Moreover, when the N-th hierarchy is a current hierarchy, the (N+1)th hierarchy is called a lower hierarchy, and the (N−1)th hierarchy is called an upper hierarchy.

When a motion vector is detected hierarchically, a motion vector in the lowest hierarchy is calculated. As shown in FIG. 9, a standard block 904 in the third hierarchy is established on a standard image 901 in the third hierarchy. Then, a motion vector V1 in the third hierarchy is obtained by performing the block matching between the standard block 904 in the third hierarchy and the reference image 905 in the third hierarchy.

Next, a search range is defined in a reference image 906 in the second hierarchy using an origin that is indicated by a motion vector (V1*2) that is obtained by doubling the motion vector V1 in the third hierarchy. Then, reference blocks are set within the search range concerned in the second hierarchy.

Next, a motion vector V2 in the second hierarchy is obtained by performing the block matching between the reference blocks set in the second hierarchy and a standard block 903 in the second hierarchy corresponding to the standard block 904 in the third hierarchy.

Next, the final motion vector V3 in the second hierarchy is calculated as a composite vector that is obtained by compositing the motion vector (V1*2) that is obtained by doubling the motion vector V1 in the third hierarchy with the motion vector V2 in the second hierarchy according to the following formula (1).

$$V3 = V1*2 + V2 \tag{1}$$

Similarly, the motion vector in the first hierarchy can be obtained with the assumption that the second hierarchy is equivalent to the (N+1)th hierarchy and the first hierarchy is equivalent to the N-th hierarchy. That is, a motion vector in a standard block 909 in the first hierarchy can be obtained by performing the block matching between a standard image 907 and a reference image 908 in the first hierarchy as mentioned above.

The motion vectors in the hierarchies other than the first hierarchy are calculated with sub pixel precision. For example, the equiangular straight-line fitting or the parabola fitting that is disclosed in Japanese Laid-Open Patent Publication (Kokai) No. 2009-301181 (JP 2009-301181A) is used as the estimating method in the block matching with the sub pixel precision.

In the detection of the motion vector with pixel precision, when the motion vector (2, 4) is calculated in the third hierarchy, the motion vector (4, 8) is obtained in the second hierarchy, for example.

On the other hand, in the detection of the motion vector with sub pixel precision, when the motion vector (2.3, 4.4) is calculated in the third hierarchy, the motion vector (4.6, 8.8) is obtained in the second hierarchy, for example. Then, the motion vector (5, 9) in the second hierarchy can be obtained with one pixel unit by rounding the fractional portion off.

Thus, when a motion vector is detected with sub pixel precision, a motion vector in an upper hierarchy is detectable with one pixel unit.

Figure 10:
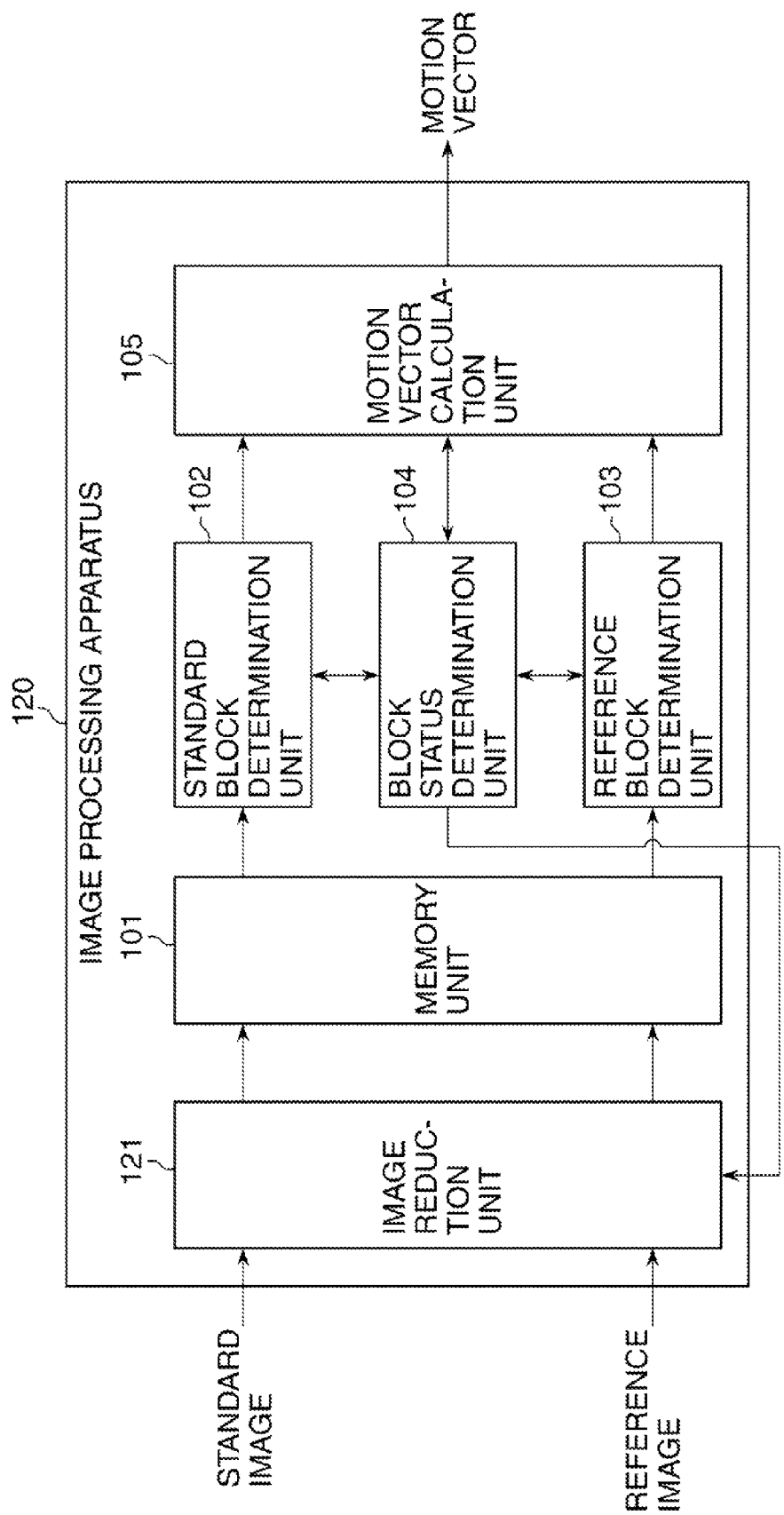
FIG. 10 is a block diagram schematically showing a configuration of the image processing apparatus according to the second embodiment of the present invention.

FIG. 10 is a block diagram schematically showing a configuration of the image processing apparatus according to the second embodiment of the present invention. It should be noted that components of the image processing apparatus 120 shown in FIG. 10 that are identical to the components of the image processing apparatus 100 shown in FIG. 1 are indicated by the same reference numerals.

The image processing apparatus 120 shown in FIG. 10 has an image reduction unit 121 that applies a reduction process to inputted images (a standard image and a reference image), and stores the inputted images and the reduced images into the memory unit 101. That is, the memory unit 101 stores standard images and reference images hierarchically. In the other words, the memory unit 101 stores hierarchical standard images and hierarchical reference images.

Figure 11:
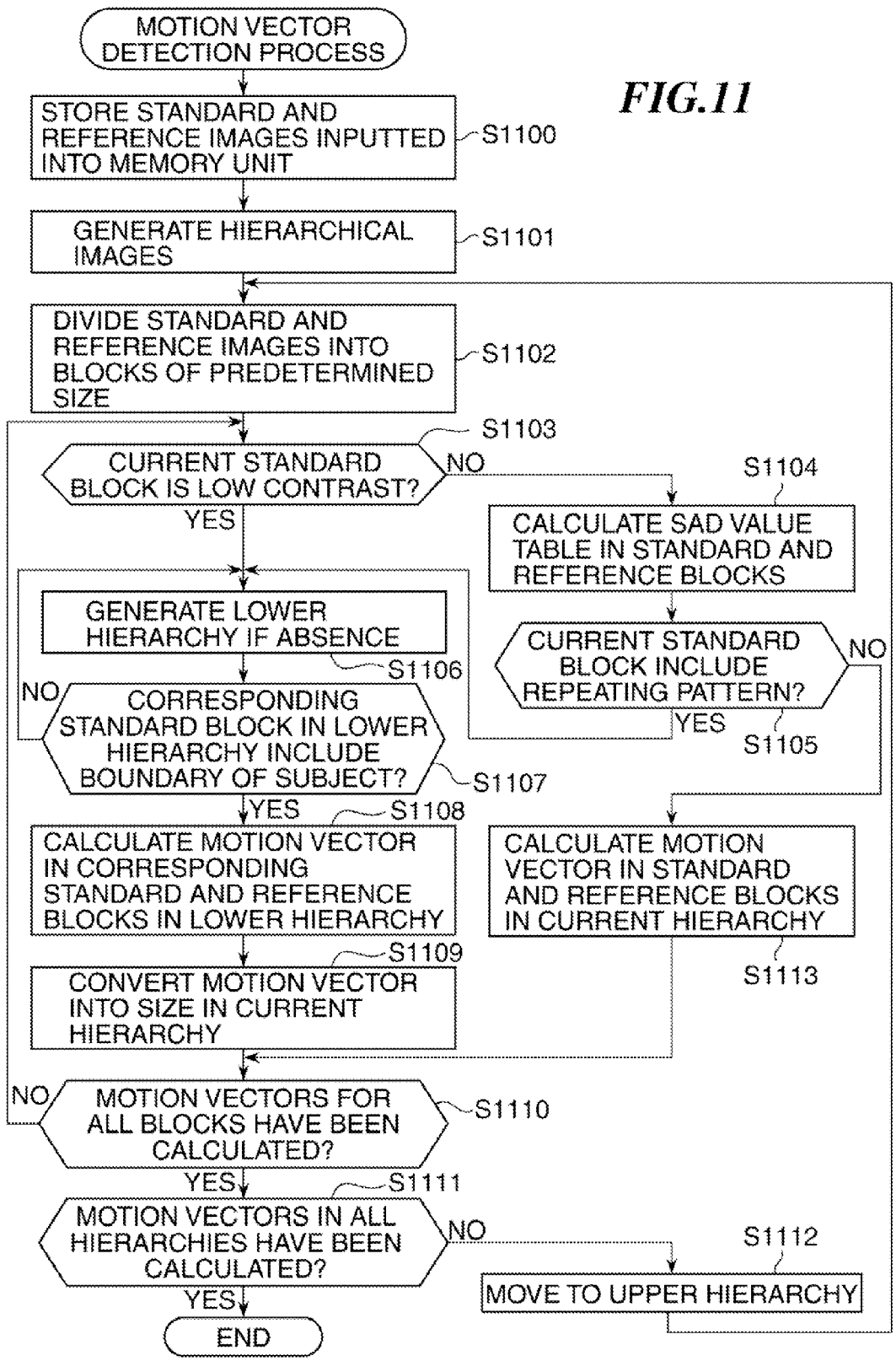
FIG. 11 is a flowchart showing a motion vector detection process in the image processing apparatus shown in FIG. 10.

FIG. 11 is a flowchart showing a motion vector detection process in the image processing apparatus 120 shown in FIG. 10.

When the motion vector detection process is started, the image reduction unit 121 of the image processing apparatus 120 receives the standard image 301 and the reference image 302 shown in FIG. 3 (step S1100). Then, the image reduction unit 121 applies the reduction process to the standard image 301 and the reference image 302 to generate hierarchical images, and stores the hierarchical images into the memory unit 101 (step S1101).

FIG. 12A and FIG. 12B are views showing a hierarchical structure of the standard image and a hierarchical structure of the reference image, respectively, which are generated by the image reduction unit 121 shown in FIG. 10.

The image reduction unit 121 makes inputted images (the standard image and the reference image) serve as images 1201 and 1204 in the first hierarchy, generates images 1202 and 1205 in the second hierarchy by reducing the images 1201 and 1204 in the first hierarchy to ½, and generates images 1203 and 1206 in the third hierarchy by reducing the images 1202 and 1205 in the second hierarchy to ½.

In a process following the step S1101, motion vectors will be detected in order of the third hierarchy, the second hierarchy, and the first hierarchy. Hereafter, a process in the case where images in the third hierarchy are read from the memory unit 101 will be described.

The standard block determination unit 102 and the reference block determination unit 103 read the standard image 1203 in the third hierarchy and the reference image 1206 in the third hierarchy from the memory unit 101, respectively. Then, the standard block determination unit 102 and the reference block determination unit 103 divide the standard image 1203 in the third hierarchy and the reference image 1206 in the third hierarchy into blocks (standard blocks and reference blocks) of a predetermined size (step S1102).

In this case, each of the standard image 1203 and the reference image 1306 is divided into seven sections in a horizontal direction and into ten sections in a vertical direction so that seventy standard blocks 401 and seventy reference blocks 402 are formed in the same manner as shown in FIG. 4. One block consists of 64*64 pixels. Then, reference characters blk[0] through blk[69] are given to the seventy standard blocks in the standard image 1203, and reference characters blk_r[0] through blk_r[69] are given to the seventy reference blocks in the reference image 1206.

Next, the block status determination unit 104 determines whether the current standard block in the third hierarchy is low contrast (step S1103). When determining that the current standard block in the third hierarchy is not low contrast (NO in the step S1103), the block status determination unit 104 obtains a SAD value table using the standard block and the reference block in the third hierarchy (step S1104).

Next, the block status determination unit 104 determines whether the standard block in the third hierarchy includes a repeating pattern with reference to the SAD value table (step S1105).

When the block status determination unit 104 determines that the standard block in the third hierarchy includes a repeating pattern (YES in the step S1105), the image reduction unit 121 generates images by reducing the standard and reference images in the current hierarchy when there is no hierarchy lower than the current hierarchy (step S1106). Then, the image reduction unit 121 stores the reduction images concerned into the memory unit 101.

In the example shown in FIG. 4, it is determined that the standard block blk[55] of the standard image in the third hierarchy includes the repeating pattern. Then, since there are no images in a hierarchy lower than the third hierarchy, the image reduction unit 121 executes the process in the step S1106.

FIG. 13A is a view showing the standard image in the third hierarchy shown in FIG. 12A, and FIG. 13B is a view showing the standard image in a fourth hierarchy that is obtained by reducing the standard image in the third hierarchy.

As shown in FIG. 13B, the image reduction unit 121 generates the standard image 1302 in the fourth hierarchy by reducing the standard image 1203 in the third hierarchy to ½.

Similarly, the image reduction unit 121 generates the reference image (not shown) in the fourth hierarchy by reducing the reference image in the third hierarchy to ½.

The standard block determination unit 102 and the reference block determination unit 103 read the standard image in the fourth hierarchy and the reference image in the fourth hierarchy from the memory unit 101, respectively, and divide the read images into blocks of a predetermined size.

The size of the standard block 1303 in the fourth hierarchy consists of 64*64 pixels in the same manner as the standard block 1301 in the third hierarchy. It should be noted that the size of the reference block in the fourth hierarchy is identical to the size of the standard block in the fourth hierarchy.

In regular detection of hierarchical motion vectors, the size of the standard block varies with change of hierarchy. On the other hand, the block size of an image in the hierarchy lower than the current hierarchy, which is generated when the standard block is low contrast or the standard block includes a repeating pattern, is identical to the block size in the current hierarchy.

As a result of this, since an image is reduced and the total number of pixels decreases in a lower hierarchy, a block size is substantially enlarged and search range becomes wider. Furthermore, the arithmetic processing amount required to detect a motion vector can be reduced as compared with the case where a motion vector is detected with enlarged block size in the current hierarchy.

The block status determination unit 104 determines whether the standard block 1303 in the lower hierarchy (the fourth hierarchy) that corresponds to the standard block 1301 in the current hierarchy (the third hierarchy) included a boundary of a subject 1304 (step S1107). As described in the first embodiment, only one high correlation region appears when a block includes a boundary. In the step S1107, it is determined whether a boundary is included or not using this principle.

When the standard block in the third hierarchy is low contrast (YES in the step S1103), the block status determination unit 104 proceeds with the process to step S1106.

When the standard block 1303 in the fourth hierarchy does not include a boundary of the subject 1304 (NO in the step S1107), the block status determination unit 104 sets the standard block 1303 in the lower hierarchy (fourth hierarchy) as the standard block of the current hierarchy, and returns the process to the step S1106.

On the other hand, when the standard block 1303 in the fourth hierarchy includes a boundary of the subject 1304 (YES in the step S1107), the block status determination unit 104 calculate a SAD value table using the standard block 1303 and the reference block in the lower hierarchy that include the boundary of the subject 1304. Then, the motion vector calculation unit 105 calculates a motion vector with reference to the SAD value table concerned (step S1108).

In the example shown in FIG. 13B, since the standard block 1303 in the fourth hierarchy includes the boundary of the subject 1304, the block status determination unit 104 proceeds with the process to step S1108.

Thus, since the standard block 1303 in the fourth hierarchy includes the boundary of the subject 1304, only one high correlation region appears, which enables to detect a motion vector with high accuracy.

Next, the motion vector calculation unit 105 converts the size of the motion vector in the lower hierarchy detected in the step S1108 into the size of the motion vector in the current hierarchy (step S1109). Here, the motion vector in the fourth hierarchy is converted into the motion vector in the third hierarchy. Since the image in the fourth hierarchy was generated by reducing the image in the third hierarchy to ½, the motion vector in the third hierarchy is obtained by doubling the motion vector in the fourth hierarchy.

Next, the motion vector calculation unit 105 determines whether the motion vectors for all the standard blocks in the fourth hierarchy as the lower hierarchy have been calculated (step S1110). When the motion vectors for all the standard blocks in the fourth hierarchy have been detected (YES in the step S1110), the motion vector calculation unit 105 determines whether the motion vectors for all the hierarchies have been detected (step S1111). Then, when the motion vector calculation unit 105 determines that the motion vectors in all the hierarchies have been detected (YES in the step S1111), the image processing apparatus 120 finishes the motion vector detection process.

On the other hand, when the motion vector calculation unit 105 determines that the motion vectors in all the hierarchies have been detected (NO in the step S1111), the image processing apparatus 120 moves the hierarchy in which motion vectors should be detected to the upper hierarchy from the current hierarchy (step S1112), and returns the process to the step S1102.

When the motion vectors for not all the standard blocks in the fourth hierarchy have been detected (NO in the step S1110), the process returns to the step S1103, and it will be determined whether the next standard block in the fourth hierarchy is low contrast.

When it is determined that the standard block in the third hierarchy does not include a repeating pattern (NO in the step S1105), the block status determination unit 104 obtains a SAD value table using the standard blocks in the standard image of the current hierarchy (third hierarchy) and the reference blocks in the reference image in the current hierarchy. Then, the motion vector calculation unit 105 calculates a motion vector with reference to the SAD value table concerned (step S1113), and proceeds with the process to the step S1110.

Thus, the second embodiment of the present invention generates an image in a lower hierarchy following to a current hierarchy when a standard block in the current hierarchy is low contrast or includes a repeating pattern. In this case, the size of the standard and reference blocks in the lower hierarchy concerned is identical to the size in the current hierarchy.

As a result of this, since a boundary of a subject is included in the standard block that is low contrast or includes a repeating pattern, a section with high correlation can be specified. As a result, the motion vectors can be detected with high accuracy, which improves the accuracy of alignment.

Next, an image processing apparatus according to a third embodiment of the present invention will be described. It should be noted that the configuration of the image forming apparatus according to the third embodiment is the same as that of the image forming apparatus shown in FIG. 10.

The second embodiment generates an image in a lower hierarchy following to a current hierarchy and detects motion vectors in the lower hierarchy when a standard block in the current hierarchy is low contrast or includes a repeating pattern. The third embodiment detects motion vectors in an upper hierarchy when a standard block in the current hierarchy is low contrast and includes a repeating pattern.

Figure 14:
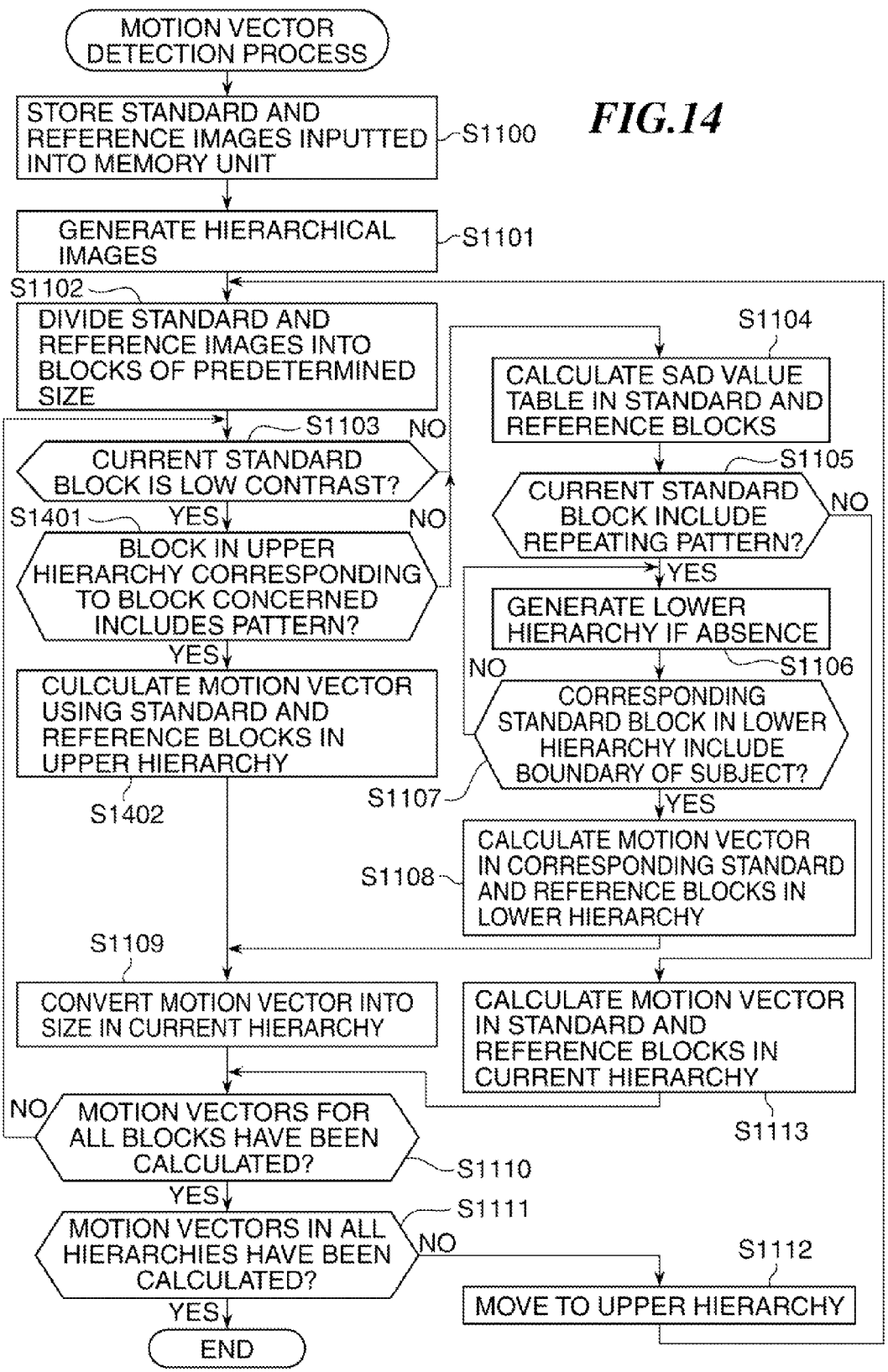
FIG. 14 is a flowchart showing a motion vector detection process executed by an image processing apparatus according to a third embodiment of the present invention.

FIG. 14 is a flowchart showing a motion vector detection process executed by the image processing apparatus according to the third embodiment of the present invention. It should be noted that the steps in FIG. 14 in which the same processes are executed as in the steps in FIG. 11 are indicated by the same step numerals and the descriptions thereof are omitted.

As shown in the flowchart in FIG. 11, the image reduction unit 121 applies the reduction process to a standard image and a reference image, generates hierarchical images, and stores the hierarchical images concerned into the memory unit 101 in step S1101.

FIG. 15A and FIG. 15B are views showing a hierarchical structure of the standard images and a hierarchical structure of the reference images, respectively, which are generated by the image processing apparatus according to the third embodiment of the present invention.

The hierarchical images as shown in FIG. 15A and FIG. 15B shall be obtained in the step S1101. The image reduction unit makes inputted images (a standard image and a reference image) serve as images 1501 and 1504 in the first hierarchy, generates images 1502 and 1505 in the second hierarchy by reducing the images 1501 and 1504 in the first hierarchy to ½, and generates images 1503 and 1506 in the third hierarchy by reducing the images 1502 and 1505 in the second hierarchy to ½.

As shown in FIG. 15A and FIG. 15B, a pattern 1508 drawn on a subject 1507 disappears in the third hierarchy due to the reduction process. Accordingly, when it is determined whether the standard block in the third hierarchy is low contrast in step S1103, the standard block blk[55] (see FIG. 4A) is determined to be low contrast, for example.

When determining that the standard block is low contrast, the block status determination unit 104 determines whether the standard block in the upper hierarchy (the second hierarchy), which corresponds to the low contrast standard block in the current hierarchy (the third hierarchy), includes a pattern that is suitable to calculate a motion vector (step S1401).

When determining whether a pattern suitable to detect a motion vector is included, the block status determination unit 104 performs edge integration for the corresponding standard block in the upper hierarchy. When the edge integration value concerned is more than a predetermined threshold and two or more local maximum values appear in a histogram created, the block status determination unit 104 determines that there is a pattern suitable to calculate a motion vector.

It should be noted that a ratio of block size is constant in the current hierarchy and an upper hierarchy. For example, when the reduction ratio is ½ and the block size in the third hierarchy is 64*64 (pixels), the block size in the second hierarchy becomes 128*128 (pixels).

For example, the block status determination unit 104 shall determine whether the standard block in the second hierarchy, which corresponds to the low contrast standard block (blk[55]) in the third hierarchy, includes a pattern suitable to calculate a motion vector.

In this case, since the standard block blk[55] in the second hierarchy includes a part of the pattern 1508 as shown in FIG. 15A, the block status determination unit 104 determines that the pattern suitable to calculate a motion vector appears in the second hierarchy.

When determining that the standard block in the upper hierarchy does not include a pattern suitable to calculate a motion vector (NO in the step S1401), the block status determination unit 104 proceeds with the process to the step S1104.

On the other hand, when determining that the standard block in the upper hierarchy includes a pattern suitable to calculate a motion vector (YES in the step S1401), the block status determination unit 104 obtains a SAD value table using the standard block in the second hierarchy corresponding to the standard block in the standard image in the third hierarchy and the reference block in the second hierarchy corresponding to the reference block in the reference image in the third hierarchy. Then, the motion vector calculation unit 105 calculates a motion vector with reference to the SAD value table concerned (step S1402).

Next, the motion vector calculation unit 105 proceeds with the process to step S1109. Since the motion vector in the second hierarchy is detected in the step S1402, the motion vector calculation unit 105 converts the motion vector in the second hierarchy into the motion vector in the third hierarchy in the step S1109.

Since the image in the third hierarchy was generated by reducing the image in the second hierarchy to ½, the motion vector in the third hierarchy is obtained by halving the motion vector in the second hierarchy.

In the flowchart shown in FIG. 14, when it is determined that the standard block includes a repeating pattern in the step S1105, a motion vector is calculated in the lower hierarchy in the steps S1106 through S1108, and the calculated motion vector is converted into a motion vector in the current hierarchy in the step S1109. Alternatively, a motion vector may be detected by enlarging the size of the standard block as described in the first embodiment.

Thus, when an image becomes low contrast because a pattern disappears due to the reduction process during a hierarchical calculation for a motion vector, the third embodiment of the present invention determines whether the corresponding standard block in the upper hierarchy includes a pattern suitable to calculate a motion vector. This avoids the situation where a motion vector is no longer calculated because an image is determined to be low contrast. As a result, the motion vectors can be detected with high accuracy, which improves the accuracy of alignment in the third embodiment.

In the examples shown in FIG. 1 and FIG. 10, the standard block determination unit 102 and the reference block determination unit 103 function as the division units as described above.

Moreover, the image reduction unit 121 functions as the size changing unit, and the motion vector calculation unit 105 functions as the motion vector detection unit.

Furthermore, the block status determination unit 104 functions as the first determination unit and the second determination unit, and the image reduction unit 121 functions as the resolution changing unit.

Although the embodiments of the invention have been described, the present invention is not limited to the above-mentioned embodiments, the present invention includes various modifications as long as the concept of the invention is not deviated.

For example, the functions of the above mentioned embodiments may be achieved as a control method that is executed by the image processing apparatus. Moreover, the functions of the above mentioned embodiments may be achieved as a control program that is executed by a computer with which the image processing apparatus is provided. It should be noted that the control program is recorded into a computer-readable storage medium, for example.

The control method and the control program have the division step, the size changing step, and the motion vector detection step at least.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-197062, filed on Sep. 7, 2012, which is hereby incorporated by reference herein in its entirety.

What is claimed is:

1. An image processing apparatus comprising:
a division unit configured to divide each of inputted images into blocks of a predetermined size;
a first determination unit configured to determine whether contrast in a block is less than a predetermined contrast for each of the blocks;
a size changing unit configured to change the size of the block concerned when said first determination unit determines that the contrast in the block concerned is less than the predetermined contrast; and
a motion vector detection unit configured to detect a motion vector by comparing images in each pair of corresponding blocks between the images, the corresponding blocks each having the changed size.

2. The image processing apparatus according to claim 1, further comprising:
a second determination unit configured to determine, when said first determination unit determines that the block is not less than the predetermined contrast, whether the block concerned includes a predetermined pattern,
wherein said size changing unit changes the size of the block concerned when said second determination unit determines that the block concerned includes the predetermined pattern.

3. The image processing apparatus according to claim 1, wherein said size changing unit expands the size of the block.

4. The image processing apparatus according to claim 1, further comprising:
a hierarchical image generation unit configured to generate hierarchical images with different resolutions for each of the inputted images,
wherein said division unit divides each of the hierarchical images into blocks, and
wherein said motion vector detection unit detects a motion vector by comparing images in each pair of corresponding blocks between the images in each of hierarchies.

5. The image processing apparatus according to claim 4, wherein said motion vector detection unit detects motion vectors sequentially from hierarchic images with the lowest resolution.

6. The image processing apparatus according to claim 5, wherein said hierarchical image generation unit generates a lower hierarchy including lower hierarchical images with a lower resolution than in the current hierarchy, when said first determination unit determines that the block is less than the predetermined contrast and there is no hierarchy lower than the current hierarchy in which a motion vector should be detected,
said size changing unit changes the size of blocks in the lower hierarchy so as to be identical to the size of blocks in the current hierarchy, when said division unit divides each of the hierarchical images in the lower hierarchy into blocks, and said motion vector detection unit detects a motion vector by comparing images in each pair of corresponding blocks between the images in the lower hierarchy, and converts the motion vector concerned into the size in the current hierarchy.

7. The image processing apparatus according to claim 6, wherein said hierarchical image generation unit decreases the resolution until the block in the hierarchical image includes a boundary of a subject without changing the size of blocks divided by said division unit.

8. The image processing apparatus according to claim 5, further comprising:

a second determination unit configured to determine, when said first determination unit determines that the block is not less than the predetermined contrast, whether the block concerned includes a predetermined pattern, wherein said hierarchical image generation unit generates a lower hierarchy including lower hierarchical images with a lower resolution than in the current hierarchy, when said second determination unit determines that the block includes the predetermined pattern and there is no hierarchy lower than the current hierarchy in which a motion vector should be detected, said size changing unit changes the size of blocks in the lower hierarchy so as to be identical to the size of blocks in the current hierarchy, when said division unit divides each of the hierarchical images in the lower hierarchy into blocks, and said motion vector detection unit detects a motion vector by comparing images in each pair of corresponding blocks between the images in the lower hierarchy, and converts the motion vector concerned into the size in the current hierarchy.

9. The image processing apparatus according to claim 5, further comprising:

a third determination unit configured to determine whether a block includes the predetermined pattern in a upper hierarchy that is upper than the current hierarchy in which a motion vector should be detected, when said first determination unit determines that the block is less than the predetermined contrast, wherein said motion vector detection unit detects a motion vector by comparing images in each pair of corresponding blocks between the images in the upper hierarchy, and converts the motion vector concerned into the size in the current hierarchy, when said third determination unit determines that a block includes the predetermined pattern in the upper hierarchy.

10. The image processing apparatus according to claim 1, wherein said first determination unit determines that the block is less than the predetermined contrast when an edge integration value obtained by integrating the edge of the block is less than a predetermined threshold and only one local maximum value appears in a histogram thereof.

11. The image processing apparatus according to claim 2, wherein said second determination unit determines that the block concerned includes the pattern when at least two SAD values are smaller than a predetermined threshold in distribution of the SAD values calculated by difference absolute sum calculation.

12. The image processing apparatus according to claim 8, wherein said second determination unit determines that the block concerned includes the pattern when at least two SAD values are smaller than a predetermined threshold in distribution of the SAD values calculated by difference absolute sum calculation.

13. The image processing apparatus according to claim 1, wherein said motion vector detection unit detects motion vectors with sub pixel precision.

14. A control method for an image processing apparatus, comprising:

dividing each of inputted images into blocks of a predetermined size;

determining whether contrast in a block is less than a predetermined contrast for each of the blocks;

changing the size of the block concerned when it is determined that the contrast in the block concerned is less than the predetermined contrast; and detecting a motion vector by comparing images in each pair of corresponding blocks between the images, the corresponding blocks each having the changed size.

15. A non-transitory computer-readable storage medium storing a control program causing a computer to execute a control method for an image composition apparatus, the control method comprising:

dividing each of inputted images into blocks of a predetermined size;

determining whether contrast in a block is less than a predetermined contrast for each of the blocks;

changing the size of the block concerned when it is determined that the contrast in the block concerned is less than the predetermined contrast; and detecting a motion vector by comparing images in each pair of corresponding blocks between the images, the corresponding blocks each having the changed size.

16. An image processing apparatus comprising:

a division unit configured to divide each of inputted images into blocks of a predetermined size;

a determination unit configured to determine whether a block concerned includes a predetermined pattern;

a size changing unit configured to change the size of the block concerned when said determination unit determines that the block concerned includes the predetermined pattern; and a motion vector detection unit configured to detect a motion vector by comparing images in each pair of corresponding blocks between inputted images, the corresponding blocks each having the changed size.

* * * * *